G. W. Wesley.
Water Wheel.
Nº 113,826. Patented Apr. 18, 1871.
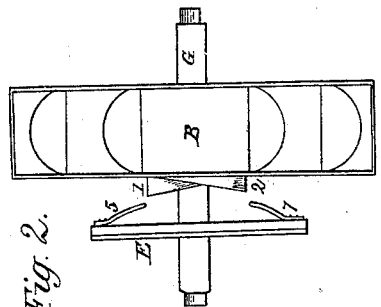
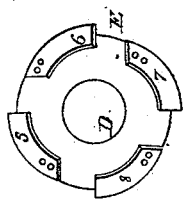 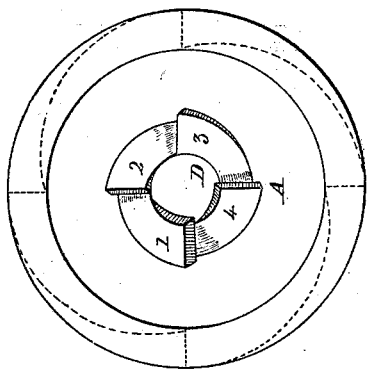
Fig. 2.
Fig. 1.
Witnesses
A. B. Richmond
Roe Reisinger
Inventor.
George W. Wesley

United States Patent Office.

GEORGE W. WESLEY, OF MEADVILLE, PENNSYLVANIA.

Letters Patent No. 113,826, dated April 18, 1871.

IMPROVEMENT IN SELF-RELEASING CLUTCHES FOR WATER-WHEELS.

The Schedule referred to in these Letters Patent and making part of the same.

*To all whom it may concern:*

Be it known that I, GEORGE W. WESLEY, of the city of Meadville, county of Crawford, State of Pennsylvania, have invented a new and improved "Self-releasing Clutch for Water-Wheels;" and I do hereby declare that the following is a full and exact description of the same, reference being had to the accompanying drawing and the letters of reference marked thereon.

The nature of my invention consists in the construction of a water-wheel with a series of circling wedges placed on the wheel around the shaft orifice so as to form a part of a clutch and at the same time become the means of release from the clutch, by the means of an inclined plane, over which the other half of the clutch must ride whenever the wheel is stopped by an obstruction—the other half of the clutch consisting of a series of springs placed on a plate in a circle, which plate is secured to the shaft. The springs are so set as to be opposite to those on the water-wheel, and so placed that when the wheel is suddenly stopped, being loose on the shaft, the rotation of the shaft will carry the springs over the risers on the wheel and thereby move the wheel out of clutch or connection, and avoid any damage to shaft or wheel.

Figure 1 represents the face view of wheel removed from shaft at D, and

Figures 1, 2, 3, 4, that portion of clutch attached to the wheel.

Fig. 2, E represents the plate keyed on the shaft, on which is placed a series of springs standing in such way as to form a rise like a wedge, and in reverse position from the clutch-blocks 1 2 3 4 on the wheel. These are marked 5 6 7 8 in fig. 4. The latter, when in place, catch against 1 2 3 4, when the wheel is suddenly stopped. The springs 5 6 7 8 ride over wedges 1 2 3 4, crowding the wheel away and then releasing the clutch at once, without any auxiliary aid.

By this way meet any obstruction from the flume striking the wheel, which is loose on the shaft, arrests its motion while the motion of the shaft, continuing for a time, carries the spring 5 6 7 8 on risers 1 2 3 4, and, by the force, presses or slides the wheel on the shaft, at once releasing the clutch, and avoids the strain of shaft or breaking of wheel-buckets.

What I claim as my invention, and desire to secure by Letters Patent, is—

A water-wheel held to its shaft by means of a clutch, one part of which clutch is secured to the hub of the wheel and the other part is secured to the shaft, the teeth or projections of one part of said clutch being made to spring and, by their yielding, release the clutch and cause the wheel to slide upon its shaft in the direction of the length of said shaft whenever the presence of any unyielding obstruction shall jar or suddenly arrest the wheel.

GEORGE W. WESLEY.

Witnesses:
A. B. RICHMOND,
ROE REISINGER.